(12) United States Patent
Truong et al.

(10) Patent No.: US 6,788,939 B2
(45) Date of Patent: Sep. 7, 2004

(54) SERVICE DEPLOYMENT ARCHITECTURE

(75) Inventors: Hong Linh Truong, Richterswil (CH); Marcel Graf, Kilchberg (CH); Yann Duponchel, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 09/819,415

(22) Filed: Mar. 28, 2001

(65) Prior Publication Data

US 2001/0044304 A1 Nov. 22, 2001

(30) Foreign Application Priority Data

May 18, 2000 (EP) ............................................. 00810433

(51) Int. Cl.$^7$ ................................................. H04Q 7/20
(52) U.S. Cl. ............................... 455/435.1; 455/435.2; 455/405
(58) Field of Search .......................... 455/435.1, 435.2, 455/438, 433, 414.1, 432.1, 445, 432.3, 405

(56) References Cited

U.S. PATENT DOCUMENTS

| | | | | |
|---|---|---|---|---|
| 5,765,105 A | * | 6/1998 | Kuriki | ........................ 455/410 |
| 6,108,554 A | * | 8/2000 | Kawamoto | ................ 455/456.5 |
| 6,337,981 B1 | * | 1/2002 | Peters | ....................... 455/432.3 |
| 6,393,274 B1 | * | 5/2002 | Peltonen | ................... 455/414.1 |
| 6,512,922 B1 | * | 1/2003 | Burg et al. | .............. 455/432.1 |
| 6,622,016 B1 | * | 9/2003 | Sladek et al. | ........... 379/201.01 |

* cited by examiner

Primary Examiner—CongVan Tran
(74) Attorney, Agent, or Firm—Louis P. Herzberg

(57) ABSTRACT

The invention is directed to a method of making communication or information services via a telecommunication network available to service users. The method entails receiving from agent initiators registrations for service offer references, receiving from a service provider for a service a service offer notification comprising a service offer reference, making available to those agent initiators who have registered themselves under the received service offer reference, the service offer notification, which is usable for obtaining a service agent for the service, and in the case of initiation of the service agent, receiving from the service agent at least one registration for a service subscription reference, receiving from the service users service subscription notifications, comprising a service subscription reference, making available to those service agents who have registered themselves under the received service subscription reference, the service subscription notification, which is at least in part usable as input for the service agent for the service.

25 Claims, 1 Drawing Sheet

SERVICE DEPLOYMENT ARCHITECTURE

FIELD OF THE INVENTION

The invention relates to a method of making communication or information services via a telecommunication network available to service users. More particularly it relates to a method of providing interprocess communication between service providers and service users via a notification and synchronization entity that has access to service nodes via which service agents are executable.

BACKGROUND OF THE INVENTION

A service can be implemented in a telecommunications network either directly in the switches or via a so-called intelligent-network architecture.

A direct implementation in the switches is in principle only suitable for networks with a small number of switches, because to be ubiquitous any new service logic has to be put into all of the switches of the network. For a network with a large number of switches such a task is time-consuming and inefficient. If the switches are from different vendors, this may even become impossible to realize.

The intelligent-network architecture was designed for a rapid deployment of services. The service logic therefore resides not in the switches but in so-called service control points (SCPs), which also contain service-specific data that allows the service providers to customize services. Switches enhanced with the capability of recognizing when it is necessary to communicate with an SCP in order to get instructions on how to proceed further with a call, are called service-switching points (SSPs).

The service logics are hence moved to a few centralized SCPs, thereby accelerating the deployment of new services because less network components are involved than in the case of direct implementation. It however requires new operation and management systems in order to introduce the service logics into the SCPs, to manage and customize them, and sometimes to set the required service triggers in the SSPs, such as recognizing the prefix of a service.

In the intelligent-network architecture only the communication between the SCPs and the SSPs is standardized but not the required operation and management systems. This lack of standardization leads to incompatible and vendor-specific SCP/SSP platforms. A rapid deployment of services is only possible within a single-vendor environment. Furthermore it is not possible to port a service logic written for a specific platform to another one, thus making it almost impossible to deploy and manage a service across multiple platforms.

In IP telephony the architecture does not require any voice switches, which is besides the use of IP as communication means for both signaling control information and voice signals the most important difference to legacy telephone networks like PSTN or ISDN. Voice signals are sent directly between the terminals, reusing the same IP routers infrastructure as for the exchange of signaling information. The most widespread IP telephony architecture is based on the ITU-T recommendation H.323. In this case the terminals are connected additionally to gatekeepers which only perform call control functions such as registration, access and admission control, address translation, etc. The gatekeepers have no voice-switching capabilities and hence can be implemented by means of conventional software servers. The signaling information may be either exchanged directly, i.e. the signaling information needed for the control of a telephony call is exchanged directly between the involved terminals, or with the gatekeeper-routed method in which case the terminals talk to their gatekeeper which has the control over the telephone call. The gatekeeper-routed method provides to a service provider a point via which it can access and control an IP telephone call. The gatekeeper thus enables the service provider to offer not only PSTN-like supplementary services like call forwarding or call completion, but also more advanced services by combining telephony with other information services, e.g. a stock alert service where the service user is alerted via a telephone call if the price of a certain stock crosses a certain limit. The architecture described above also applies for other protocols like IETF-SIP or -MGCP.

The IN architecture can also be applied to IP telephony. The gatekeepers are considered as SSPs, which means that they intercept the telephone calls and recognize when it is necessary to contact an SCP for further instructions on how to proceed with a call from an IN-point of view. The only difference between a gatekeeper and an authentic SSP is that the gatekeeper performs only call control whereas an authentic SSP performs both call control and voice switching. This IN-based architecture allows for telecommunication service providers to reuse their expensive SCP-based service infrastructure to offer supplementary services to IP telephony users. However it exhibits the disadvantage of the vendor-specific aspect of SCP platforms which hinder the rapid deployment and the portability of services. It also reduces the range of offerable supplementary services to the capability of the existing SCPs.

SUMMARY OF THE INVENTION

It is an object of the invention to provide an architecture for service deployment that is scalable in number of service users, service executions, services and service providers.

It is another object of the invention to provide an architecture for service deployment that circumvents the problem of vendor-specific implementation which restricts the implementation of new services and the deployment and portability of services and reduces the range of offerable supplementary services to the capabilities of existing service-control points.

It is another object of the invention to provide an architecture for service deployment that provides to a service provider an easy and efficient means for supplying new services into the network and modifying them.

It is another object of the invention to provide an architecture for service deployment that allows service subscribers to directly customize their service profiles.

It is another object of the invention to provide an architecture for service deployment that permits the addition and removal of service nodes to distribute load over multiple such nodes, requiring only a minimum configuration therefor.

It is another object of the invention to provide an architecture for service deployment that is more reliable because a failing service node can be easily replaced by another one.

The invention is directed to a method of making communication or information services via a telecommunication network available to service users. In accordance with the method, registrations for service offer references are received from agent initiators. These agent initiators may reside in service nodes where they have been preprogrammed to register for certain services under the respective service offer references. For these references even a wild card approach may be used which refers to more than one service at once.

Also from a service provider for a service a service offer notification comprising a service offer reference is received. This is done via a provider module that provides its input to a notification and subscription service entity, also called NaSS entity, where the service offer references are received. The NaSS entity is performing the function of a repository of information where the information is collected and may be accessed by other entities. It may also be seen as sort of marketplace where the service providers present their services which may be then accessed by others. There may be several service providers offering several services, each of which corresponds to a service offer notification.

Then, to those agent initiators who have registered themselves under the received service offer reference, the service offer notification can be forwarded, i.e. if there is a match between an offered service and a desired service, information about the service, being contained in the service offer notification, is delivered to the agent initiator who asked for that service. The service offer notification is usable for obtaining a service agent for the service. The service agent might even be contained directly in the service offer notification. The service offer notification might also contain a pointer to where the service agent can be found. The agent initiator can then download or access the service agent.

The above actions can be regarded as a "publish-subscribe" mechanism, wherein the notification corresponds to the publication and the registration corresponds to the subscription.

Once the service agent is activated in the service node, this agent may need additional information to be executed. This additional information may be user-specific or environment-specific or be of any other nature.

For obtaining this additional information as input, a second "publish-subscribe"-like mechanism is performed. Namely from the service agent are received registrations for service subscription references, which means that the service agent asks for input. From the service users service subscription notifications are received. The service subscription notifications comprise a service subscription reference, i.e. the name of the service for which the service user wants to subscribe. Once a match between the notified service subscription reference and the service subscription reference for which the service agent registered, is found, the service subscription notification can be delivered to the corresponding service agent, i.e., the service subscription notification is made available to those service agents who have registered themselves under the received service subscription reference. The service subscription notification is then usable as input for the service agent for the service. The service is then executable.

In other words, the service deployment architecture allows a service provider to send a service offer notification to the NaSS entity. The service offer notification comprises a service agent descriptor which has a service offer reference. Service nodes which have been preprogrammed to have an agent initiator and access to a set of core services, register at the NaSS entity for services under a desired service offer reference. If the desired service offer reference matches the sent service offer reference, the service agent descriptor is forwarded to the agent initiator of the service node where the agent descriptor's content is examined as to whether the service node is able to support the corresponding service agent. If the service agent is supportable, the service agent is fetched from its source. This source could be the service provider, some other place or even the service agent descriptor.

Service users subscribe for services giving a subscription reference to the NaSS entity. Furthermore the service agent in the service node registers itself at the NaSS entity with a desired subscription reference. If those two references match, the subscription information is made available to the service agent. Thereby the service user can hand over information to the service agent of the service the user intends to use, e.g. for a call forwarding-on-no-reply service, the service user can give the time after which the forwarding shall be performed and the number to which the call shall then be forwarded.

BRIEF DESCRIPTION OF THE DRAWINGS

Examples of the invention are depicted in the drawings and described in detail below by way of example. It is shown in FIG. 1 a schematic depiction of the components of an service execution environment (SEE) platform.

DETAILED DESCRIPTION OF THE INVENTION

Figure 1:
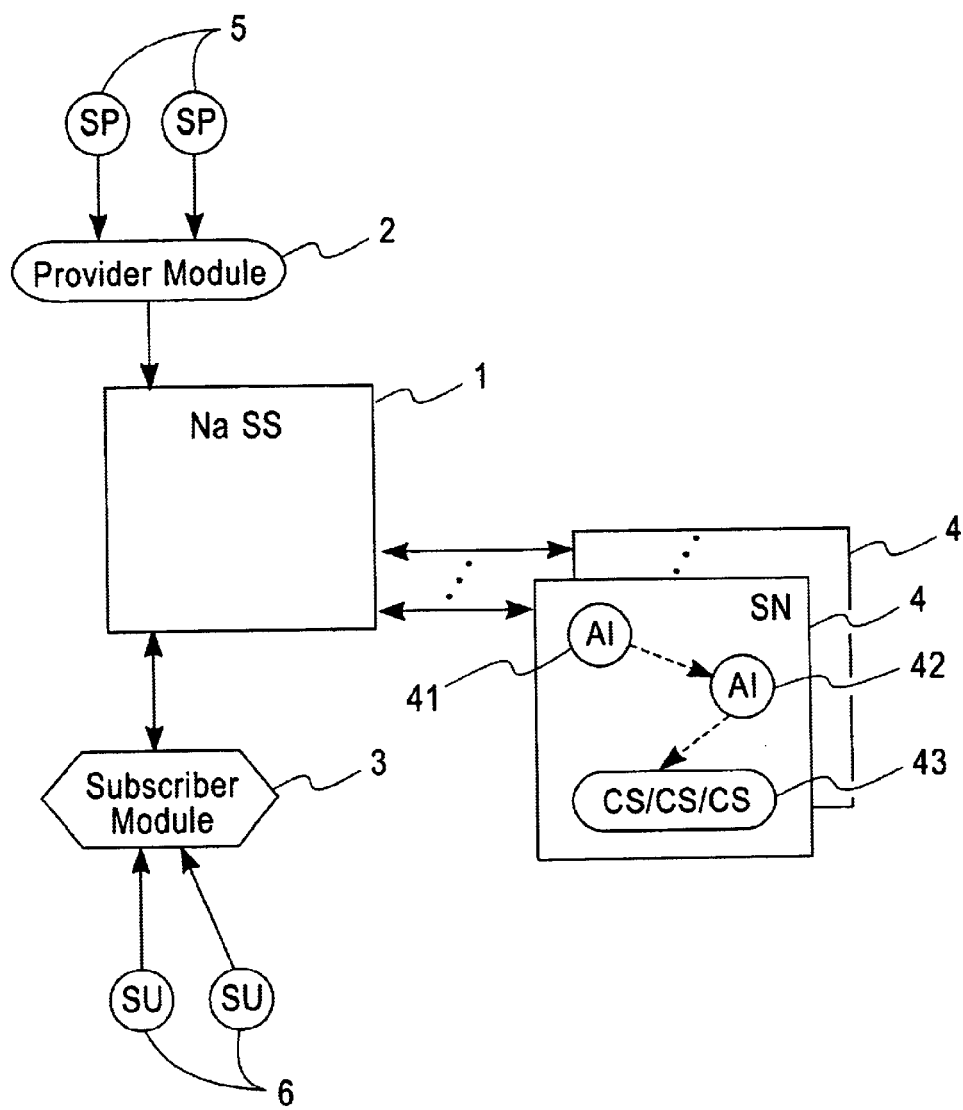

In the following, the various exemplary embodiments of the invention are described.

In FIG. 1 a schematic diagram for a service execution environment is depicted.

In the center of the invention lies an entity which provides a notification and synchronization service, referred to herein as "NaSS entity", to service users 6 and service providers 5 which are connected to that NaSS entity 1 via a telecommunications network. For communicating with the NaSS entity 1, the service users 6 use a subscriber module 3 and the service providers 5 use a provider module 2. Furthermore, the NaSS entity 1 has access to service nodes 4 which comprise an agent initiator 41 and here already comprise service agents 42 and a group of core services 43. The NaSS entity is also referred to as system entity. It has the main function of receiving information, comparing names and either forwarding information or rendering access thereto. It may comprise a memory for storing information.

NaSS entity 1, the subscriber module 3, the provider module 2, the service agents 42, agent initiators 41 and core services 43 together are referred to as SEE platform, each of them being a SEE component.

The whole depicted system provides for the possibility for the service providers 5 to offer services to the service users 6. The NaSS entity 1 thereby functions as a sort of communicator in that each time a service provider 5 wants to offer a new service to the service users 6, this service offer is notified by him to the NaSS entity 1 which communicates the service offer notification to the service nodes 4. On the other hand, the service users 6, also called NaSS subscribers, signal to the NaSS entity 1 their wish to use a certain service by subscribing to that service. That is done by sending a service subscription notification to the NaSS entity 1 which communicates it to the service nodes 4.

The NaSS entity 1, is hence a SEE subsystem which provides to the other SEE components an interprocess communication mechanism. The service providers 5 send their service offer notifications to the NaSS entity 1 which also receives the subscriptions from the service users 6.

The association between the service providers 5 and the agent initiator 41 and also between the service users 6 and the service agent 42 is performed by means of a service reference, also referred to as a name.

The service offer notification contains an agent descriptor, to be described further below.

For the communication via the NaSS entity 1, to receive a service offer notification sent by a certain service provider 5, the agent initiator 41 needs only to know the name under which the service provider 5 sends the service offer notification, but not the identity of the service provider 5 itself. The service provider 5 also does not need to know who will receive its service offer notification. In case there are multiple agent initiators 41 registering to services with one and the same name, the NaSS entity 1 will multicast the service offer notification to all agent initiators 41.

The NaSS entity 1 is implemented in such a way that it is scalable in the number of service providers 5, NaSS subscribers 6, service nodes 4, and in the number of names.

After having received a specific service offer notification, the NaSS entity 1 distributes it to the service nodes 4 according to their registrations. Namely the agent initiators 41 register at the NaSS entity 1 under one or more service offer references. The service offer notifications of those incoming service offer references from the service providers that match the registrations, are then made available to the agent initiators 41. The agent initiators 41 use the received or fetched service offer notification to decide whether to initiate the corresponding service agent and upon a positive result thereof initiate the service agent 42. The code therefor is loaded from where the service agent can be found. The core services which the service agent uses to execute its service may already be resident in the service node. They may also be loaded there later if necessary.

In general, all the SEE components communicate with each other using the NaSS entity 1 as interprocess communication mechanism, without knowing the location of their actual peer component. They may communicate via the NaSS entity 1 even if they are located on the same service node 4. That permits placing of any SEE component into any service node 4 without the need for complicated configuration work.

An exception to that rule may be the telephony call control service which provides its services to the other components via the JTAPI interface.

Any service to be offered is based on one or more core services 43. A number of core services 43 can be used to provide advanced services. There are two ways in which one or more of the core services 43 can be accessed:

1. Through the NaSS Entity

In this case, the core service 43 can be accessed by all SEE components, independent of which service node 4 they are residing on.

2. Directly

In this case the core service 43 is primarily accessible by the SEE components residing on the same service node 4. It may not be available to SEE components residing on other service nodes 4. An example of a core service 43 with direct access is the call control service using JTAPI. A service agent 42 which wants to control a call offered by a JTAPI interface then needs to be co-located with that JTAPI.

Providing access to a core service 43 does not mean that this core service 43 in any case has to be implemented. If the core service 43 is already implemented by another system, e.g. telephony services, then of course that service need not be implemented again but the service agents 42 will be given the means to access and control it.

The SEE platform can be extended by adding new core services 43. As mentioned above, the core services 43 can be used to create advanced services by either modifying the way a core service 43 is executed, also referred to as supplementary service or by combining multiple core services 43, also referred to as hybrid service. During its life time, an advanced service transits through phases during which some logic is executed by the SEE platform. Such logic is run by the service agents 42. The service agents 42 are designed and created by a service creator who may be the service provider 5 but need not be. In general, several service agents 42 are used to implement one advanced service. The SEE platform does not assume any specific relation between service agent 42 and the phases of the service life cycle, i.e. during a phase, multiple service agents 42 may be executed in parallel, and a service agent 42 may also cover multiple phases. There are two types of service agents 42 depending on the core services 43 they access:

If the core service 43 can only be accessed directly, then the service agent 42 is executed on the service node 4 on which the core service 43 is accessible. Because there are multiple service nodes 4 available, there may be also multiple instances of the same service agent 42 running in parallel in the SEE platform.

If the core service 43 is accessible through the NaSS entity 1, then typically there is only one instance of the service agent 42 running in one service node 4.

The service agents 42 are initiated by an agent initiator 41. Once initiated, a service agent 42 runs on its own, i.e. it interacts directly with the other SEE components, without any help from the agent initiator 41. The information that is used by the agent initiator 41 to be able to load and initiate service agent 42 is the service agent descriptor; it may comprise the following elements:

1. Event descriptor: events that will trigger the agent initiator 41 to initiate the service agent 42;

2. Code: the service logic to be run;

3. Data descriptor: the service objects, e.g. types, instances, invocations, or private data, used by the service agent 42 to do its job;

4. Core services descriptor: the core services 43 the service agent 42 accesses to do its job, e.g. call control. This information is important for core services 43 that are only directly accessible.

The service agents 42 are created, i.e. coded, by the service creator and their service agent descriptors are made available to the agent initiators 41 during the deployment and operation phase of the service by sending the service offer notification to the NaSS entity 1.

As a consequence, at service node start up time, the agent initiator 41 may register with the NaSS entity 1 for all service agent descriptors in order to get the service agents 42 that are made available by the service provider 5. The service agents 42 are then sent to the registered service nodes 4.

Upon receiving a service agent descriptor, the agent initiator 41 checks the service agent's core services descriptor to learn whether it is able to support that service agent 42. It is assumed that the agent initiator 41 knows the capabilities of the service node 4 it is residing on. Those capabilities depend inter alia on the set of core services 43 present in the service node 4 or reachable by it. If it is not able to support the service agent 42, the published service agent 42 is ignored. Otherwise, the agent initiator 41 subscribes to the NaSS entity 1 or a core service interface, e.g. in case of JTAPI, for the events that are described in the service agent's event descriptor.

Depending on how time-critical the service agent execution is, the agent initiator 41 may prefetch the service agent code, load and initiate it right after it has received the service agent descriptor. It may also prefetch the data objects described by the service agent data descriptor. In any case, the latest moment when the agent initiator 41 downloads the service agent code and data is the first occurrence of an event described in the service agent event descriptor.

At the occurrence of one of the events described in the service agent event descriptor, the agent initiator 41:

downloads the service agent code, loads and initiates it if this has not already been done;

registers with the NaSS entity 1 to get the data objects specified by the service agent's data descriptor if they were not already prefetched; and starts the service agent's code with the data objects it gets from the NaSS entity 1.

The agent initiator 41 and therefore the SEE platform is agnostic about:

the number of service agents 42 a certain service may need. It is the responsibility of the service creator to define the number of service agents 42 needed by a service.

the number of subscribers 6 involved by a service agent 42, i.e. the logic executed by a service agent 42 may be specific for a single subscriber 6, but also be valid for a group of subscribers 6.

relation between service agent 42 and service life cycle.

The service node 4 is a physical entity which contains at least the agent initiator 41 and is therefore able to initiate the service agents 42. Furthermore it provides to the SEE components it hosts access to at least a core service 43 and to the NaSS entity 1 for communicating and exchanging information with other SEE components.

In general, the SEE platform contains multiple service nodes 4. To be scalable in the number of service users 6, the processing load generated on the platform should be spread over several service nodes 4. There are two approaches possible regarding the division of the load: by function, i.e. task, or by load-generating request. In the case of division by function a service node specializes in performing only certain subtasks. To handle a request several service nodes 4 communicate to coordinate the subtasks. In the case of division by load-generating request a service node 4 performs all subtasks for a request. When a request enters the system it is assigned to one service node 4.

The notification and synchronization service entity 1 is a SEE subsystem which is responsible for delivering notifications between the SEE components. As an interprocess communication mechanism of the SEE platform it fulfills the following functions:

There are services which monitor continually changing information, e.g. stock alert or snow alert, and use a mechanism to transfer those changes to the service agents. Because there may be many service agents 42 that use the same information, a multicasting mechanism may be used.

When the load is divided by request, there are a variable number of service nodes that communicate. Furthermore it is not possible to know a-priori which service agents 42 will run on which service nodes 4. It is therefore preferable to use a mechanism that enables to communicate anonymously, without having to specify the precise service node 4 to talk to.

It is desirable to have a management part of the SEE platform which collects information about the operation of the SEE platform, particularly of the service nodes 4. The NaSS entity 1 offers with the described register-notify mechanism a means for realizing such supervision without requiring constantly maintained and updated lists of the SEE components. A management node could register for such purpose with the NaSS entity 1 which forwards all corresponding notifications from the service nodes 4 to that management node which automatically gets the updates from all active SEE components. Thereby the communication mechanism could be easily 'tapped' without the communicating entities being aware of it.

The NaSS entity 1 service enables anonymous communication between the NaSS users 6 through the concept of names for the notifications and registrations. To communicate with each other the SEE components need not know the identity of the other components, they only need to know the name of the notification. The SEE components don't even have to know whether the peer component(s) with which they want to communicate exist yet.

The SEE components that use the NaSS service may reside in the same Java Virtual Machine (JVM) or in different JVMs. The NaSS entity 1 hides the distribution from the SEE components. That enables the distribution of the processing load that the service platform generates across several service nodes 4.

The specification of the NaSS entity service comprises the following parts:

A namespace for naming notifications.

A publishing or notification mechanism for the service offer notifications of the service providers 5.

A subscription or registration mechanism for the registrations of the agent initiators 41.

A publishing or notification mechanism for the service subscription notifications of the service users 6.

A subscription or registration mechanism for the registrations of the service agents 42.

Notifications of the same type are given a common name. The name is part of the NaSS notification namespace. For example messages from the Reuters financial information services company that contain the current stock price of AT&T shares traded at the New York Stock Exchange may have the name Reuters/NYSE/ATT.

The namespace should have the following properties:

Names are globally unique in the NaSS.

Names are hierarchical. The agent initiator 41 is then able to use a wild card to refer to a whole subtree of the hierarchy and thus subscribe simultaneously to several names. The hierarchy can help the NaSS implementation to become scalable in the number of names.

Hierarchy levels may be separated by a reserved separator character, for example a slash, '/'.

The service provider 5 publishes, i.e. sends, the service offer notifications under the service offer reference, i.e. name. The service provider 5 does not need to be aware of registered agent initiators 41 to make a publication. It just needs to know the name. If there are no registered agent initiators 41 at the time of the publication, the NaSS entity 1 may discard the service offer notification. The service provider 5 even cannot be aware of agent initiators 41 when the NaSS entity 1 does not provide information about their existence. Several service providers 5 may publish service offer notifications under the same name. Again, the NaSS entity 1 need not provide information about the existence of these other service providers 5.

The registrant is the service initiator 41 or the service agent 42 that registers for a notification under a certain name. The registrant does not need to be aware of service providers 5 to make a registration. It just needs to know the name. If there are no service providers 5 at the time of registration the NaSS entity 1 may anyway accept the registration. The registrant even cannot be aware of service providers when the NaSS entity 1 does not provide information about their existence. Several registrants may register under the same name. When there is a matching notification the NaSS entity 1 delivers a copy to each of them (multicast mechanism). Again, the NaSS entity 1 does not provide information about the existence of these other registrants.

A wild card registration enables a registrant to register to several names with a single operation or register to a name that it does not know completely. A registrant makes a wild card registration when the string it provides in the registration contains one or more occurrences of the reserved wild card symbol '*'. The NaSS entity 1 then compares this string to all the names known to the NaSS entity 1, currently and in the future. The wild card registration is equivalent to a set of registrations, one for each matching name. The wild card symbol '*' matches any sequence of characters up to and excluding the next separator character ('/'). For example a wild card registration to receive all stock prices from Reuters at the New York stock exchange regardless of the stock symbol may use a string of /Reuters/NYSE/* and to receive all stock prices from Reuters for AT&T regardless of the stock exchange may use a string of /Reuters/*/ATT.

Assuming the existence of the service agents coded as described, the provisioning function helps the operator inject the service agents into the network using the publishing mechanism of the SEE platform (provision phase). For example, the service provider 5 can publish the service agent implementing the CFNR supplementary service using the NaSS name /serviceagent/descriptor/cfnr. With this naming scheme, the Agent Initiator would then subscribe to the name /serviceagent/descriptor/*. The wild card * is used to refer to all notifications published using names that start with /serviceagent/ descriptor/. In this way all service agent descriptors published via the provisioning function will be forwarded by the NaSS entity 1 to the agent initiators.

Certainly, by giving a more complex structure to the NaSS names, specialized service nodes and agent initiators could be introduced into the network. In this case, these nodes would subscribe only to (and therefore get only) the agents of the services in which they were interested. This example shows the strength of the architecture: service logics can easily be transferred to the appropriate network nodes, without the need to know the location and configuration of the various nodes explicitly.

This also applies to the registration phase, in which the service user 6 can register for a service and customize his service profile according to his needs. The subscription function 3 besides interfacing with the user, publishes the most up-to-date user data into the SEE platform. In this way any components in the system, e.g. service agents, currently registered to those data always get the most recent one from the NaSS entity 1. Although the subscription function is shown as a component different from a service node 4, it can certainly be designed in a very similar way. This means that it may also contain an agent initiator for initiating service agents, which, in this case, will run during the registration phase and not, as in the case of the service nodes, during the utilization phase. These "registration" agents are also created by a service creator and injected into the network using the provisioning function described above.

The service subscription reference sent by the service user 6 contains an identifier for the service user 6 such that the corresponding service is customized for that service user 6, e.g., the service subscription reference for the call-forward-on-no-reply (cfnr) service may be service object/cfnr/userid. The service subscription reference used by the service agent 42 after having been initiated and at latest while being executed will be identical. The service agent 42 is provided from the core service 43 with information containing the identifier and hence is able to fetch via the NaSS entity 1 the necessary input for providing the CFNR service to the identified service user 6. The service user 6 may with the service subscription notification give other parameters for the corresponding service, e.g. here the phone number to which the call shall be forwarded. The subscription module 3 should be the interface which facilitates the collection of the necessary input information from the service user 6.

The NaSS entity 1 including the subscription module 3 and the provisioning module 2, the agent initiator 41, the service agent 42 may be realized as a software program run on one or more computers, servers or the like, and stored on a computer readable medium such as a magnetic or optical disk, or the like.

The described embodiments are combinable in part as well as in whole.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

It is obvious that a person skilled in the art can modify the shown arrangements in many ways without departing from the spirit of the invention which is encompassed by the subsequent claims.

What is claimed is:

1. Method of making communication or information services via a telecommunication network available to service users, comprising the steps of
    a) receiving from agent initiators registrations for service offer references,
    b) receiving from a service provider for a service a service offer notification comprising a service offer reference,
    c) making available to those agent initiators who have registered themselves under said received service offer reference, said service offer notification, which is usable for obtaining a service agent for said service, and in the case of initiation of said service agent,
    d) receiving from said service agent at least one registration for a service subscription reference,
    e) receiving from said service users service subscription notifications, comprising a service subscription reference,
    f) making available to those service agents who have registered themselves under said received service subscription reference, said service subscription notification, which is at least in part usable as input for said service agent for said service.

2. Method according to claim 1, wherein the services are provided via the service agents located in at least one service node.

3. Method according to claim 1, wherein the service offer references and/or service subscription references are chosen from a namespace in which the service offer references and/or service subscription references are unique and/or hierarchical.

4. Method according to claim 3, wherein a said registration refers to several service offer references and/or service subscription references at once, by citing only part thereof or a wild card operator.

5. Method according to claim 4, wherein the service offer notification is received comprising a service agent descriptor which describes in which events the service agent is to be started and a reference to where the code of the service agent can be found or the code itself.

6. Method according to claim 5, wherein the service subscription reference is received comprising an identifier of the service user.

7. Method according to claim 6, wherein the service load is spread over several of the service nodes by function in that each service node performs subtasks and a request is handled in that several of the service nodes communicate to coordinate their subtasks, or the service load is spread over several of the service nodes per service request in that one of the service nodes performs all subtasks for a service request and each time a service request arrives it is assigned to one of the service nodes.

8. Method according to claim 2, wherein the service agent is initiated if the service node provides or has access to the necessary resources for executing said service agent.

9. Method according to claim 8, wherein the service agent is executed making use of core services residing in or being accessible by the service node.

10. Method according to claim 5, wherein the service agent is executed upon occurrence of a said event using said input.

11. Method for a service provider of making communication or information services via a telecommunication network available to service users, comprising the step of sending to a system entity for a service a service offer notification comprising a service offer reference, whereby said system entity receives from agent initiators registrations for service offer references and makes available to those agent initiators who have registered themselves under said received service offer reference, said service offer notification, which is usable for obtaining a service agent for said service and in the case of initiation of said service agent receives from said service agent at least one registration for a service subscription reference and receives from said service users service subscription notifications, comprising a service subscription reference and makes available to those service agents who have registered themselves under said received service subscription reference, said service subscription notification, which is at least in part usable as input for said service agent for said service.

12. Method according to claim 11, wherein the service offer references and/or service subscription references are chosen from a namespace in which the service offer references and/or service subscription references are unique and/or hierarchical.

13. Method according to claim 12, wherein the service offer notification is sent comprising a service agent descriptor which describes in which events the service agent is to be started and a reference to where the code of the service agent can be found or the code itself.

14. Method for an agent initiator of making communication or information services via a telecommunication network available to service users, comprising the steps of a) sending to a system entity at least one registration for a service offer reference, said system entity receiving from a service provider for a service a service offer notification comprising a service offer reference, and b) if said at least one registration is under said service offer reference received by said system entity, being granted access to said service offer notification, which is usable for obtaining a service agent for said service, and c) deciding whether to initiate said service agent, wherein said at least one registration refers to several service offer references and/or service subscription reference at once, preferably by citing only part thereof or a wild card operator.

15. Method according to claim 14, wherein the service offer notification is received comprising a service agent descriptor which describes in which events the service agent is to be started and a reference to where the code of the service agent can be found or the code itself.

16. Method according to claim 15, wherein the service agent is initiated if it has access to the necessary resources for executing said service agent.

17. Method for a service user of customizing communication or information services via a telecommunication network, comprising the step of sending to a system entity a service subscription notification, comprising a service subscription reference, whereby said system entity receives from at least one service agent at least one registration for a service subscription reference and makes available to those service agents who have registered themselves under said received service subscription reference, said service subscription notification, which is at least in part usable as input for said service agent for said service, and wherein the service subscription reference is chosen from a namespace in which the service subscription references are unique and/or hierarchical.

18. Method according to claim 17, wherein a said registration refers to several service offer references and/or service subscription references at once, preferably by citing only part thereof or a wild card operator.

19. Method according to claim 18, wherein the service subscription reference is sent comprising an identifier of the service user.

20. Method according to claim 19, wherein the service agent is executed upon occurrence of a predetermined event using said input.

21. Method according to claim 20, wherein the service agent is initiated if it has access to the necessary resources for executing said service agent.

22. Computer program product comprising program code means stored on a computer-readable medium for performing a method according to claim 1.

23. Computer program product comprising program code means stored on a computer-readable medium for performing a method according to claim 11.

24. Computer program product comprising program code means stored on a computer-readable medium for performing a method according to claim 14.

25. Computer program product comprising program code means stored on a computer-readable medium for performing a method according to claim 17.

* * * * *